(12) United States Patent
Eickhoff et al.

(10) Patent No.: US 8,187,348 B2
(45) Date of Patent: May 29, 2012

(54) HYDROGEN GENERATOR

(75) Inventors: Steven J. Eickhoff, Plymouth, MN (US); Chunbo Zhang, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 686 days.

(21) Appl. No.: 12/400,599

(22) Filed: Mar. 9, 2009

(65) Prior Publication Data

US 2009/0252670 A1    Oct. 8, 2009

Related U.S. Application Data

(60) Provisional application No. 61/043,081, filed on Apr. 7, 2008.

(51) Int. Cl.
 *B01J 7/00* (2006.01)
 *C01B 3/36* (2006.01)
 *C01B 6/24* (2006.01)
 *C01B 3/02* (2006.01)

(52) U.S. Cl. ........ 48/61; 48/197 R; 423/644; 423/648.1; 423/658.2

(58) Field of Classification Search .......... 48/61, 197 R; 422/625–629; 423/644–658.2
See application file for complete search history.

(56) References Cited

U.S. PATENT DOCUMENTS

| | | | |
|---|---|---|---|
| 2,721,789 A | 10/1955 | Gill | |
| 4,155,712 A | 5/1979 | Taschek | |
| 4,261,955 A | 4/1981 | Bailey, Jr. et al. | |
| 4,964,524 A * | 10/1990 | Halene | 220/586 |
| 5,128,219 A * | 7/1992 | Kohler et al. | 429/59 |
| 5,372,617 A | 12/1994 | Kerrebrock et al. | |
| 5,443,616 A | 8/1995 | Congdon | |
| 5,527,632 A | 6/1996 | Gardner | |
| 5,532,074 A * | 7/1996 | Golben | 429/53 |
| 5,593,640 A * | 1/1997 | Long et al. | 422/111 |
| 5,634,341 A | 6/1997 | Klanchar et al. | |
| 5,702,491 A * | 12/1997 | Long et al. | 48/197 R |
| 5,932,369 A | 8/1999 | Komada et al. | |
| 5,958,098 A | 9/1999 | Heung | |
| 6,093,501 A | 7/2000 | Werth | |
| 6,280,865 B1 | 8/2001 | Eisman et al. | |
| 6,432,566 B1 | 8/2002 | Condit et al. | |
| 6,461,752 B1 * | 10/2002 | Leung | 429/421 |
| 6,528,441 B1 | 3/2003 | Heung et al. | |
| 6,586,124 B2 | 7/2003 | Kelley et al. | |
| 7,556,660 B2 | 7/2009 | Shurtleff et al. | |

(Continued)

FOREIGN PATENT DOCUMENTS

DE    19941085 A1    3/2001

(Continued)

OTHER PUBLICATIONS

"U.S. Appl. No. 11/789,520 Final Office Action mailed Jul. 22, 2010", 12 Pgs.

(Continued)

*Primary Examiner* — Matthew Merkling
(74) *Attorney, Agent, or Firm* — Schwegman, Lundberg & Woessner P.A.

(57) ABSTRACT

A hydrogen generator includes a container with multiple concentric hollow cylinders of chemical hydride fuel disposed within the container. A water vapor source is disposed within the container and operable to deliver water vapor to the cylinders of chemical hydride fuel. Generated hydrogen is provided via a hydrogen output port formed in the container.

15 Claims, 4 Drawing Sheets

U.S. PATENT DOCUMENTS

| | | | |
|---|---|---|---|
| 2001/0025670 A1* | 10/2001 | Ovshinsky et al. | 141/231 |
| 2002/0182459 A1 | 12/2002 | Hockaday et al. | |
| 2003/0044656 A1* | 3/2003 | Wood | 429/19 |
| 2003/0207175 A1 | 11/2003 | Ovshinsky et al. | |
| 2003/0228252 A1 | 12/2003 | Shurtleff | |
| 2005/0036941 A1 | 2/2005 | Bae et al. | |
| 2005/0037245 A1 | 2/2005 | Pham | |
| 2005/0079129 A1 | 4/2005 | Venkatesan et al. | |
| 2005/0106097 A1 | 5/2005 | Graham et al. | |
| 2005/0112018 A1 | 5/2005 | Schulz et al. | |
| 2005/0196659 A1 | 9/2005 | Grieve et al. | |
| 2005/0238810 A1 | 10/2005 | Scaringe et al. | |
| 2006/0101943 A1 | 5/2006 | Snow et al. | |
| 2006/0292065 A1 | 12/2006 | Wolverton et al. | |
| 2007/0020172 A1 | 1/2007 | Kirby et al. | |
| 2007/0031325 A1 | 2/2007 | Carruthers et al. | |
| 2007/0104996 A1 | 5/2007 | Eickhoff et al. | |
| 2007/0124989 A1* | 6/2007 | Eickhoff et al. | 44/301 |
| 2007/0237995 A1 | 10/2007 | Eickhoff et al. | |
| 2008/0241613 A1* | 10/2008 | Kelly et al. | 429/17 |
| 2009/0098419 A1 | 4/2009 | Eickhoff et al. | |

FOREIGN PATENT DOCUMENTS

| | | |
|---|---|---|
| DE | 102004061286 A1 | 6/2006 |
| EP | 1675200 A2 | 6/2006 |
| EP | 2055669 A2 | 5/2009 |
| GB | 2165532 | 4/1986 |
| JP | 08067939 | 3/1996 |
| WO | WO-2005004273 A2 | 1/2005 |
| WO | WO-2005/064227 | 7/2005 |
| WO | WO-2006005892 A1 | 1/2006 |
| WO | WO-2006041854 A2 | 4/2006 |
| WO | WO-2006091227 A1 | 8/2006 |
| WO | WO-2007/008893 | 1/2007 |
| WO | WO-2007/055763 | 5/2007 |
| WO | WO-2007067406 A2 | 6/2007 |

OTHER PUBLICATIONS

"U.S. Appl. No. 11/789,520, Response filed Apr. 21, 2010 to Non Final Office Action mailed Jan. 28, 2010", 14 pgs.

"U.S. Appl. No. 11/934,011, Notice of Allowance mailed Feb. 17, 2010", 6 pgs.

"U.S. Appl. No. 11/934,011, Notice of Allowance mailed Jun. 2, 2010", 6 pgs.

"European Application Serial No. 09156184.5, Extended European Search Report mailed Jul. 6, 2010", 7 pgs.

"European Application Serial No. 08166990.5, European Office Action mailed Mar. 10, 2010", 5 pgs.

"European Application Serial No. 08166990.5, European Search Report mailed Feb. 19, 2010", 3 Pgs.

"U.S. Appl. No. 11/789,520, Final Office Action mailed Nov. 18, 2009", 13 pgs.

"U.S. Appl. No. 11/789,520, Non Final Office Action Mailed Jun. 25, 2009", 13 pgs.

"U.S. Appl. No. 11/789,520, Non-Final Office Action mailed Jan. 28, 2010", 17.

"U.S. Appl. No. 11/789,520, Response filed Jan. 4, 2010 to Final Office Action mailed Nov. 18, 2009", 14 pgs.

"U.S. Appl. No. 11/789,520, Response filed Sep. 24, 2009 to Non Final Office Action mailed Jun. 25, 2009", 13 pgs.

"U.S. Appl. No. 11/934,011, Response to Restrictions filed Jul. 16, 2009", 7 pgs.

"U.S. Appl. No. 11/934,011, Non Final Office Action Mailed Oct. 1, 2009", 7 pgs.

"U.S. Appl. No. 11/934,011, Response filed Jan. 4, 2010 to Non Final Office Action mailed Oct. 1, 2009", 7 pgs.

"U.S. Appl. No. 11/934,011, Restriction Requirement mailed Jul. 13, 2009", 6 pgs.

"European Application No. 08166990.5, European Search Report Mailed Dec. 3, 2009", 3 pgs.

"United Kingdom Application Serial No. 0818681, Combined Search and Examination Report mailed Oct. 28, 2008", 4 pgs.

Diaz, H., et al., "Thermodynamic and Structural properties of LaNi5-yAly compounds and their related hydrides", *International Journal of Hydrogen Energy*, 4, (1979), 445-454.

Mendelsohn, M. H., et al., "The Effect of Aluminum Additions on the Structural and Hydrogen Absorption properties of AB5 Alloys with Particular reference to the LaNi5-xAlx Ternary Alloy System", *Journal of the Less-Common Metals*, 63, (1979), 193-207.

Mintz, M., et al., "The reaction of hydrogen with magnesium alloys and magnesium intermetallic compounds", *Journal of the Less-Common metals*, Elsevier-Sequoia S.A Lausanne, CH, vol. 74, No. 2, 263-270 pgs.

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California, (Nov. 13-20, 2004), 1-9.

Saboungi, M. L, et al., "Computation of isothermal sections of the Al-H-Mg system", *Calphad. Computer Coupling of the Phase Diagrams and Thermochemistry*, New York, NY, US, vol. 1, No. 3, 237-251 pgs.

Yabe, et al., "Thermal stability and hydrogen absorption/desorption properties of $Mg_{17}Al_{12}$ produced by bulk mechanical alloying", *Journal of Alloys and Compounds, Elsevier Sequoia*, Lausanne, CH, vol. 433, No. 1-2, 241-245 pgs.

Zhang, et al., "Hydriding behaviour of $Mg_{17}Al_{12}$ compound", *Materials Chemistry and Physics, Elsevier*, vol. 94, No. 1, 69-72 pgs.

"European Application Serial No. 09156184.5, Office Action mailed May 12, 2011", 7 pgs.

"European Application Serial No. 09156184.5, Response filed Aug. 23, 2011 to Office Action mailed May 12, 2011", 9 pgs.

\* cited by examiner

HYDROGEN GENERATOR

RELATED APPLICATION

This application claims priority to U.S. Provisional Application Ser. No. 61/043,081 (entitled HYDROGEN GENERATOR, filed Apr. 7, 2008) which is incorporated herein by reference.

BACKGROUND

Hydrogen is an important gas for many different applications. Many current sources of hydrogen involve heavy metal canisters, which may not be practical for selected applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Various embodiments of a hydrogen generator are described. A first set of embodiments describes a pressure regulated hydrogen generator using a chemical hydride fuel, and a second set of embodiments describes a hydrogen generator utilizing multiple hollow cylinders of chemical hydride fuel to provide high volume hydrogen production under pressure.

Figure 1:
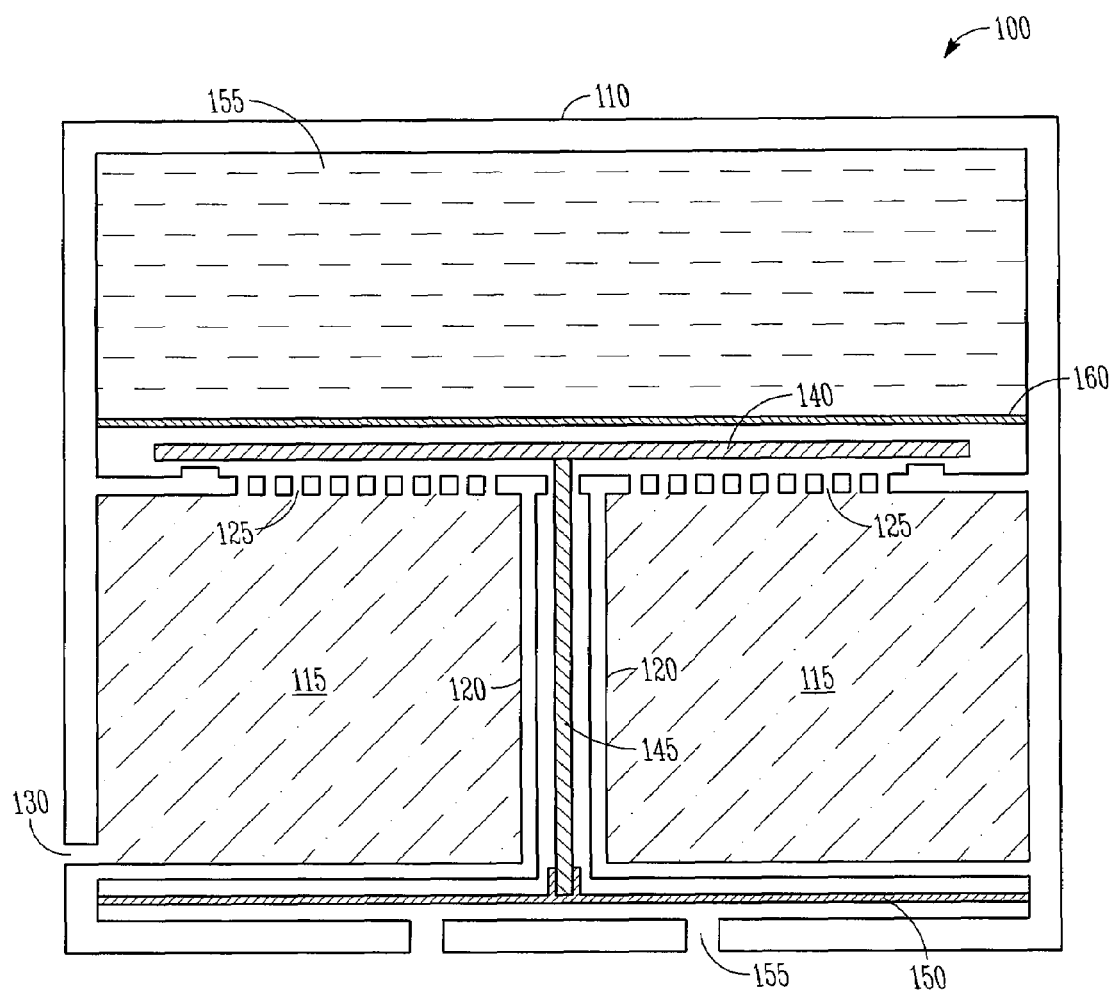
FIG. 1 is a cross section representation of a hydrogen generator according to an example embodiment.

A hydrogen generator is shown generally in cross section at 100 in FIG. 1. A pressure vessel 110 may be cylindrical in shape, and designed to hold the generator 100 components and generated hydrogen under pressure. Vessel 110 may be constructed of steel in one embodiment. Other materials suitable for handling desired pressures and materials may be used in different embodiments.

A chemical hydride fuel 115 is shown disposed within a portion of the vessel 110. The hydride may be disposed within a fuel chamber 120, which may be formed of the same material as the vessel 110. The vessel 110 may form portions of the fuel chamber 120 in one embodiment, such as a shared outer wall. The fuel chamber 120 in one embodiment has openings 125 that allow water vapor to enter the fuel chamber 120 and interact with the hydride fuel 115 to produce hydrogen. An output port 130 is formed through the vessel 110 and chamber 120 to provide hydrogen to an application, such as fuel cell, chemical reactor, balloon, or any other application in need of hydrogen, including hydrogen under pressure.

The fuel chamber 120 may be formed with a valve seat 135 that provides a seal for a valve disk 140 disposed to regulate access to the openings 125 in chamber 120. A valve pin is coupled to valve disk 140 and extends through a shaft 145 extending through the fuel chamber 120 to a flexible diaphragm 150. Flexible diaphragm 150 is coupled to the vessel 110 in one embodiment, or otherwise secured, and provided access to ambient, such as via air vents 155. The flexible diaphragm/valve pin/valve disk assembly operates as a regulator for the hydrogen generator 100. As pressure builds inside the hydrogen chamber 120, the diaphragm moves down in this example, causing the valve disk 140 to move toward valve seat 135.

As the valve disk 140 moves toward valve seat 135, a source of water vapor is cut off from the hydride fuel 115, and production of hydrogen decreases. If more hydrogen is released via output port 130, the valve disk 140 moves away from the valve seat, allowing more water vapor to be provided to the hydride fuel 115, and more hydrogen to be produced.

In one embodiment, water vapor is provided from a water source 155, such as a water and salt solution. Salt may be used to lower the freezing point of the water source 155. Other chemicals and methods of lowering the freezing point of the water source may be used in further embodiments. The water source 155 is separated within the vessel 110 from the hydride fuel 115 via a selectively permeable membrane 160, which is water impermeable and water vapor permeable.

Some potential uses for the hydrogen generator 100 may include:

High purity carrier gas for a portable gas chromatograph.
Hydrogen source for a proton exchange membrane or solid oxide fuel cell.
Portable heat source for cutting, welding, chemical reactions, high temperature sensors.
Hydrogen source for a miniature chemical reactor.
Hydrogen source as a reducing agent.
Constant pressure source for dispensing liquids, microfluidic applications.
Pressure source for pneumatic power; pneumatic actuators, valves, pumps.
A hydrogen source for rehydriding a metal hydride, applications include fuel cells, sensors, etc.
Hydrogen source for generating a hydrogen plasma in a portable device, cutting tool, radiation source (ex. UV).
Hydrogen source to generate clean water and power using a fuel cell.
Pressurized hydrogen source for cooling portable devices (high speed turbines, electronics, etc).
As a hydrogen source for a H2/O2 combustion device for firing a projectile.
Hydrogen source for a miniature dirigible as a sensing platform for building surveillance.
Hydrogen source for a combustion based miniature hot air balloon.
Hydrogen source for a toy hydrogen.
Generate a calibration gas for a sensor (H2, electrochemical CO, combustible gases, etc).
Emergency jumping aide for soldiers using combustion (in a piston, for example) energy from a H2/O2 chemical reaction calculation, a 100 kg soldier can jump 1 meter~15 times with 38 grams of LiAlH4, assuming 30% chemical to mechanical conversion efficiency).

Still further embodiments may provide pressurized hydrogen gas for a wide range of commercial and industrial applications. Some embodiments may be used to replace heavy, metal, gas cylinders of hydrogen. Embodiments may provide a lightweight, more compact hydrogen sources are desired for many portable applications.

While the hydrogen generator 100 may take the form of several different shapes and sizes, in some embodiments, the volume of the generator 100 may be less than 2 cc and may be cylindrical in shape. Hydrogen mass flow from such a size may be about $8.2^{-6}$ g/sec with a delivery pressure of about 100 psi. In some embodiments, the valve assembly may be spring loaded open to obtain desired maximum pressures. This may be accomplished by disposing a spring about the valve pin 145 and supported by the fuel chamber 120 at one end, with the other end biased against the underside of the valve disk 140 to bias the valve disk open. The hydrogen generator may operate over various temperatures, such as a range of $-40°$ C. to $80°$ C.

Figure 2:
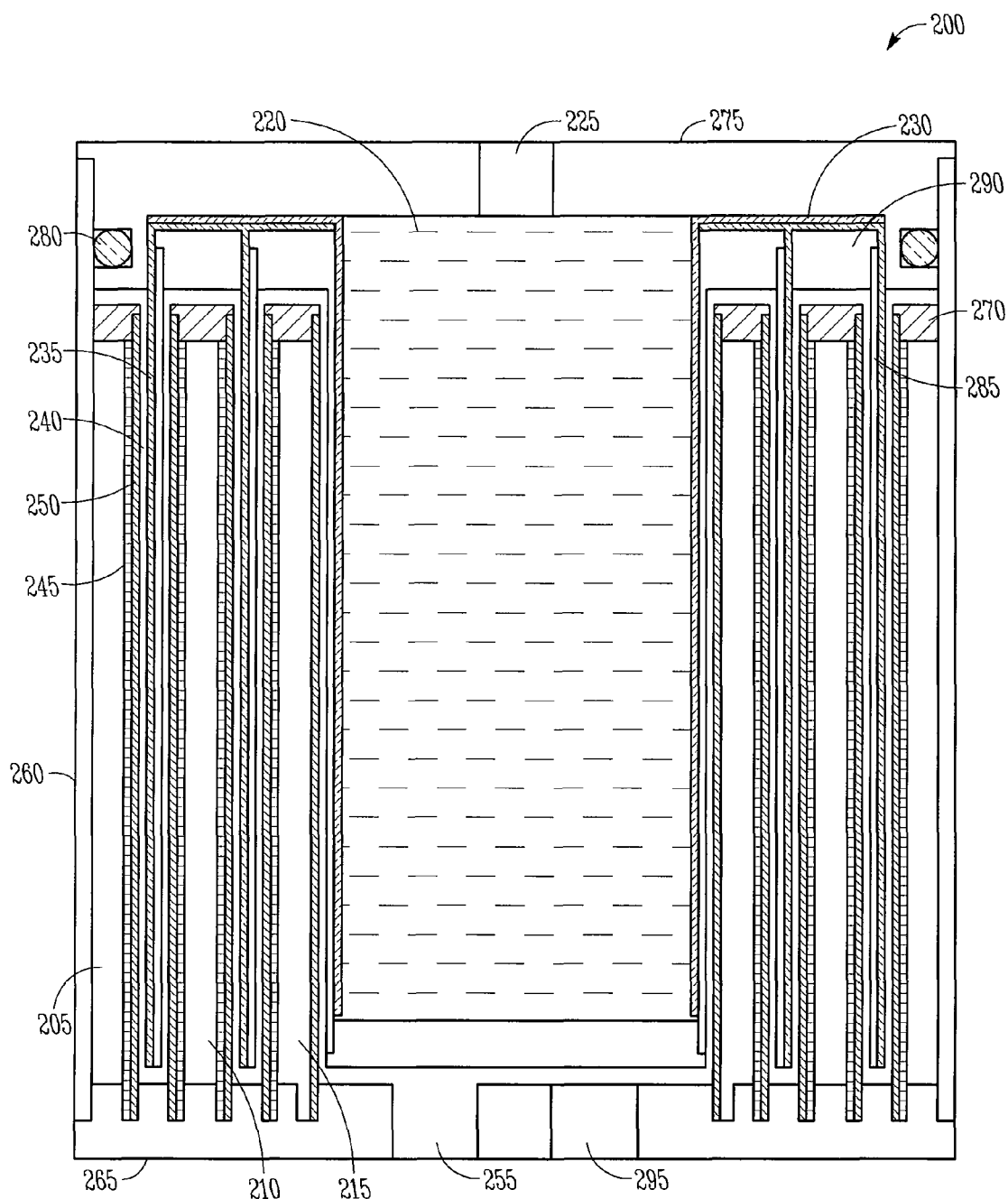
FIG. 2 is a cross section of a multiple fuel cylinder hydrogen generator according to an example embodiment.
Figure 3:
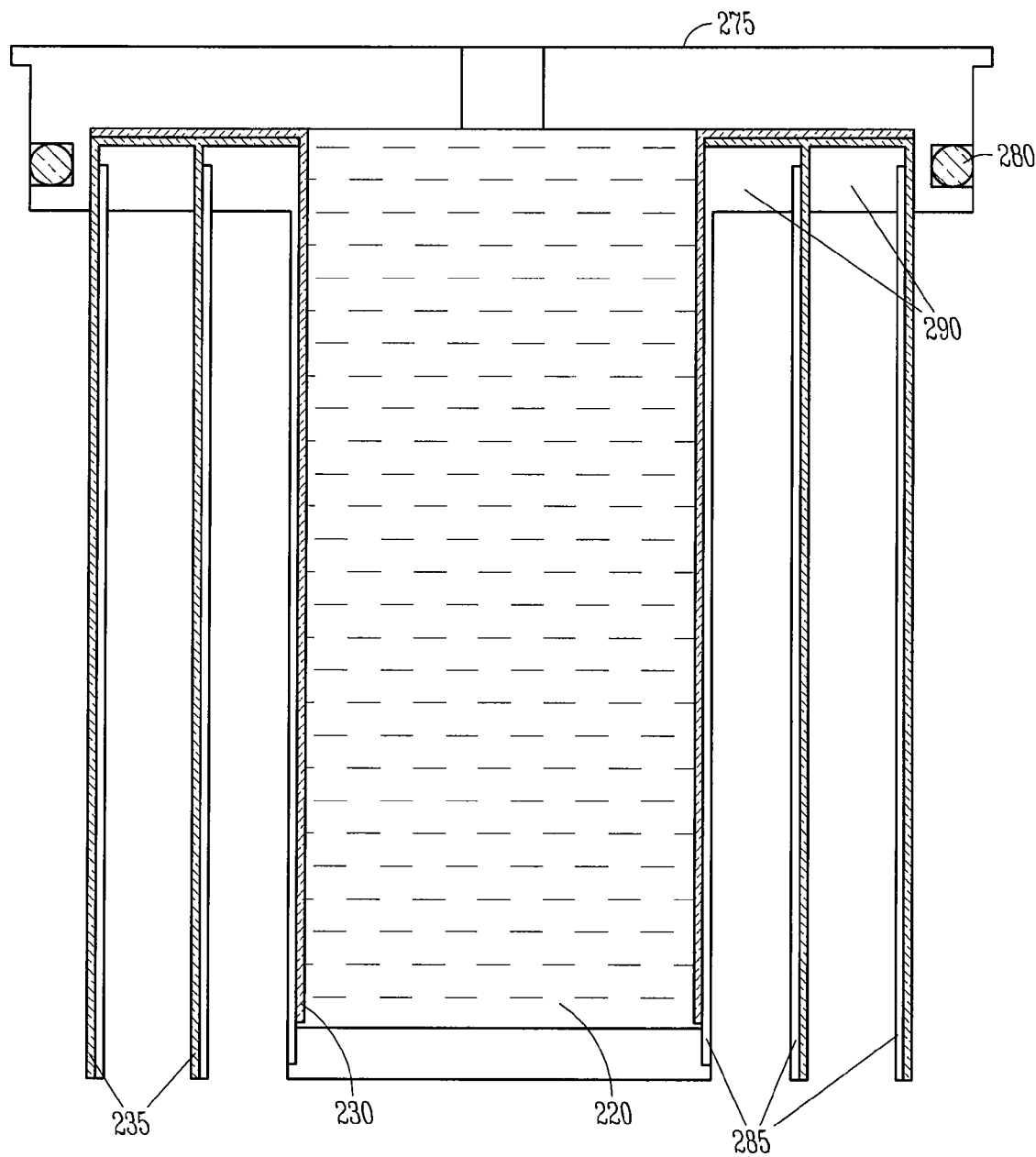
FIG. 3 is a cross section of a top portion of the hydrogen generator of FIG. 2.
Figure 4:
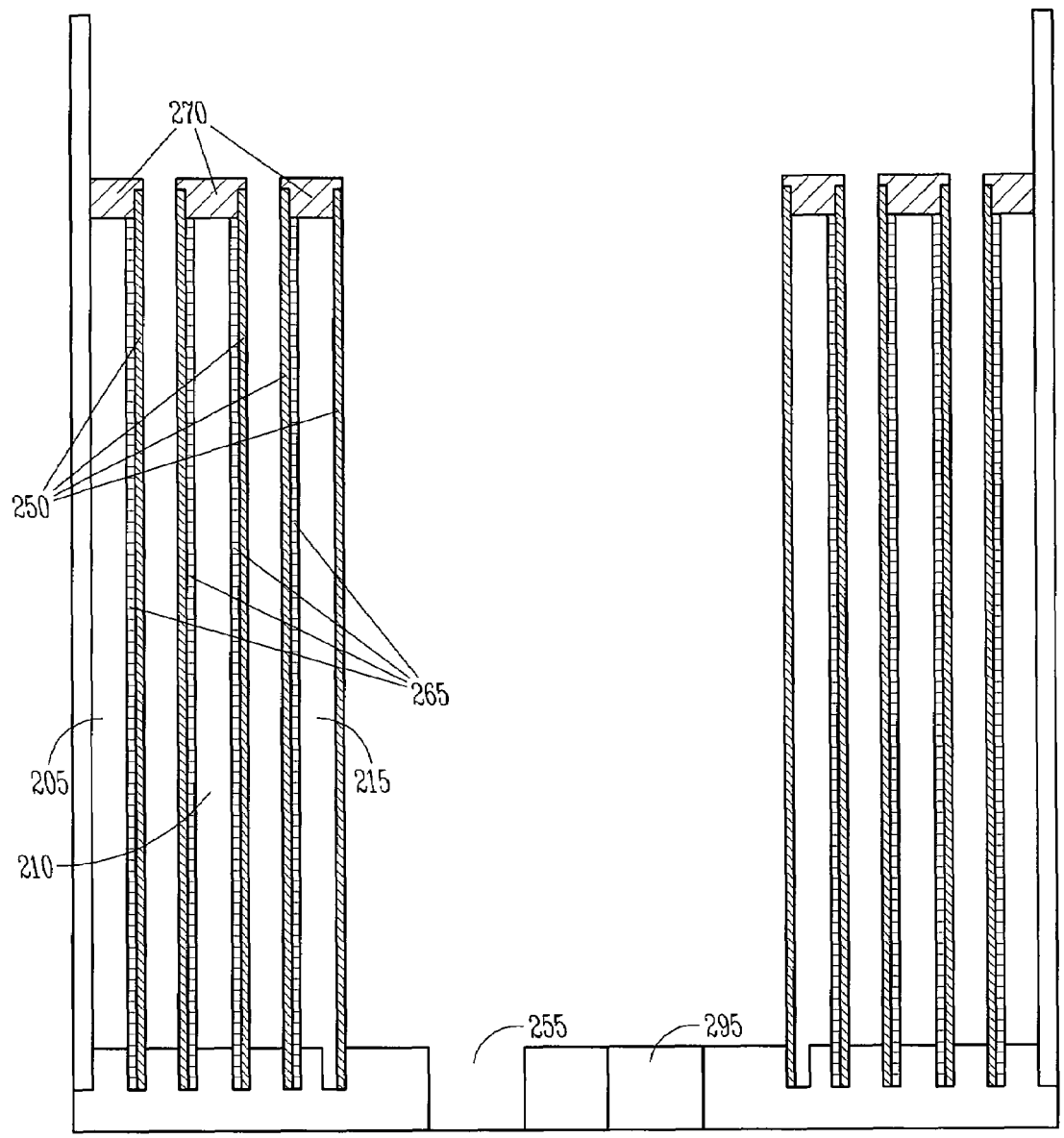
FIG. 4 is a cross section of a bottom portion of the hydrogen generator of FIG. 2.

FIG. 2 is a cross section of an alternative hydrogen producing system 200. FIG. 3 illustrates a cross section of a top portion of system 200, and FIG. 4 illustrates a cross section of a bottom portion of system 200. The reference numbers are consistent across FIGS. 2, 3 and 4.

System 200 includes multiple hollow cylinders of a hydrogen producing fuel indicated at 205, 210 and 215. Three such cylinders are provided in one embodiment, though further embodiments may contain fewer or more such cylinders arranged in a concentric manner. In various embodiments, the cylinders may be round, or other geometric shapes, such as oval, triangular, rectangular, etc. The term "cylinder" is meant to cover all such geometric shapes, and the term "concentric" is intended to refer to the ability to place different size cylinders within each other.

In one embodiment, the cylinders are formed of a porous chemical hydride formed of granules of chemical hydride sized to provide a large surface area for reaction of the chemical hydride with water vapor. The thickness of the cylinders may be selected to result in a bulk reaction of the chemical hydride with the water vapor. The water vapor in one embodiment, penetrates through the thickness of the cylinders such that substantially all of the chemical hydride may react with the water vapor.

In one embodiment, a water reservoir 220 is formed inside of the concentric cylinders, and includes a resealable water port 225 to add water to the water reservoir 220 to begin a reaction to produce hydrogen. A water wicking material 230 is formed in contact with water in the water reservoir 220. In one embodiment, the wicking material extends down into the water reservoir 220 to transport water form the bottom of the water reservoir 220 as water is consumed to produce hydrogen. A second water wicking material 235, which may be formed separately, or as a continuation of the wicking material 230 extends toward the cylinders of fuel, and extends down selected sides of such cylinders, separated by an air gap 240 and a selectively permeable membrane 245.

The selectively permeable membrane 245 in one embodiment is supported by a metal support 250. Metal support 250 in one embodiment is formed of perforated copper to provide for heat transfer and to hold the membrane 245 and fuel in place.

Cylinder 210, as can be observed, has the wicking material 235 and selectively permeable membrane 245 disposed on both the inside and outside of the cylinder 210 walls. Water vapor from the wicking material 230 and 235 passes through the selectively permeable membrane 245, reacts with the fuel in the cylinders to generate hydrogen, and the hydrogen passes back through the selectively permeable membrane 245. The hydrogen passes through air gaps 240 to an output port 255 formed in a container 260, which provides support for the cylinders and other elements of system 200, as well as suitable containment for generated hydrogen under pressure. Container 260 also has concentric slots 265 formed in a base of container 260. The slots are formed to provide alignment and support for the metal supports 250 and corresponding membranes 245 to support the cylinders. Annular plugs 270 are formed at a top of the fuel cylinders to provide support for the metal supports 250 and form a water tight seal to prevent liquid water from reaching the fuel cylinders. In one embodiment, the plug 270 for cylinders 210 and 215 have two annular grooves to mate with the metal supports on both sides of the cylinders. The plug 270 for cylinder 205 has a single annular groove, with an outside of the plug being smooth for directly contacting container 260. In further embodiments, an additional metal support 250 may be used on the outside of cylinder 205, in which case the plug 270 for cylinder 205 may have two annular grooves.

As seen in further detail in FIGS. 3 and 4, the container 260 contains a base, and walls that may be formed in the same shape as the concentric fuel cylinders disposed within it, and welded or otherwise affixed to the base of container 260. A top portion of the walls of container 260 may have threads formed to mate with corresponding threads on a cap 275 that is assembled with the container 260 to form system 200. An O-ring 280 may be used to provide a seal between container 260 and cap 275. For cylinder shapes other than near circular, the cap may be welded or otherwise sealed with container 260 to provide sufficient retentive force in the face of hydrogen under pressure.

Cap 275 in one embodiment includes supports 285 extending toward the base, and forming walls of the water reservoir 220. The wicking material 230 and 235 may be supported by the supports 285. The supports 285 may be coupled to a top portion of the cap by annular rings 290 formed to space the supports apart to leave room for the fuel cylinders 205, 210 and 215. In one embodiment, the supports 285 are welded to the rings 290, but may be attached in other manners, such as adhesive or mechanical couplers. In one embodiment, container 260, cap 275, supports 285 and rings 290 may be formed of 216 stainless steel or other suitable material that provides structural strength to withstand the pressure of generated hydrogen, and also to withstand the chemical reactions occurring in system 200.

A release valve 295, such as a pressure release valve distributed by Lee Company of Westbrook, Conn., may be formed in the container 260 and used to vent excess generated hydrogen when the pressure of hydrogen in container 260 exceeds a predetermined pressure, such as approximately 100 PSI in one embodiment.

In one embodiment, the wicking material 230, 235 may be formed from a wide range of materials that operate to transport water. Pressed fibrous metal, polymers with pores, porous paper and any other water transport film may be used in various embodiments. The air gap 240 may be used to diffuse water vapor from the wick, and to provide a path for generated hydrogen to reach the hydrogen output port 255.

Metal supports 250 may be formed of perforated copper in one embodiment, and may be used to help transfer heat away from the fuel cylinders, as heat is generated in the reaction with water vapor to produce hydrogen. The metal supports 250 also may operate to hold the porous permeable membrane in place, as well as holding the fuel in place within the container 260.

In one embodiment, the concentric cylinders of fuel provide the ability to react the fuel quickly with water vapor and create a high hydrogen generation and flow rate. In one embodiment, the chemical hydride is porous, with a grain size of from approximately 1 to 100 μm. In one embodiment, the average grain size is approximately 10 μm. The size of the grain provides a low diffusion resistance and results in uniform hydrogen generation. A flat discharge rate may be provided with proper grain size and thickness of the cylinders.

The hydrogen generating system 200 is scalable from a few cc's volume to much larger sizes. In smaller embodiments, the hydrogen generating system 200 may serve to provide a hydrogen carrier gas for portable instruments, such as a gas chromatography instrument. Adding water via water filling port 225, and then resealing the water filling port 225 using a threaded plug, initiates a reaction that starts to produce hydrogen within a short period of time, such as a few minutes or less.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A hydrogen generator comprising:
   a container;
   a multiple concentric hollow cylinders of chemical hydride fuel disposed within the container;
   a water vapor source disposed within the container and operable to deliver water vapor to the cylinders of chemical hydride fuel; and
   a hydrogen output port formed in the container;
   a hydrogen vapor source comprising a water reservoir and wicking material extending into the water reservoir and disposed adjacent the hollow cylinders of chemical hydride to provide water vapor; and
   water impermeable, water vapor and hydrogen permeable membranes disposed between the wicking material and the hollow cylinders of the chemical hydride fuel.

2. The hydrogen generator of claim 1 wherein the hollow cylinders of chemical hydride fuel are substantially round.

3. The hydrogen generator of claim 1 wherein the generator comprises three concentric hollow cylinders of chemical hydride.

4. The hydrogen generator of claim 1 wherein the wicking material comprises a first wicking material extending into the water reservoir and a second wicking material in fluid contact with the first wicking material and extending adjacent the hollow cylinders of chemical hydride.

5. The hydrogen generator of claim 1 and further comprising air gaps between the membranes and the hollow cylinders of chemical hydride, wherein the air gaps are formed to provide diffusion of the water vapor and transport of generated hydrogen.

6. The hydrogen generator of claim 5 and further comprising a pressure release valve coupled to the air gaps and operable to maintain hydrogen pressure in the container at or below a predetermined pressure.

7. The hydrogen generator of claim 1 and further comprising perforated metal supports coupled to membranes and positioned to support the membrane, confine the hollow cylinders of chemical hydride, and transfer heat generated during reaction of the chemical hydride with water vapor.

8. The hydrogen generator of claim 1 wherein the hollow cylinders of chemical hydride are formed a with grain size of from approximately 1 to 100 μm.

9. A pressurized hydrogen generator comprising:
   a pressure container;
   a multiple concentric hollow cylinders of chemical hydride fuel disposed within the container;
   a water reservoir within a smallest hollow cylinder of chemical hydride fuel;
   a wicking structure coupled to the water reservoir and extending along sides of the multiple concentric hollow cylinders of chemical hydride fuel to provide water vapor to the fuel; and
   water impermeable and hydrogen and water vapor permeable membranes separating the wicking structure from each of the multiple concentric hollow cylinders of chemical hydride fuel; and
   a hydrogen output port.

10. The pressurized hydrogen generator of claim 9 wherein the hollow cylinders of chemical hydride fuel are substantially round.

11. The pressurized hydrogen generator of claim 9 wherein the generator comprises three concentric hollow cylinders of chemical hydride.

12. The pressurized hydrogen generator of claim 9 and further comprising air gaps between the membranes and the hollow cylinders of chemical hydride, wherein the air gaps are formed to provide diffusion of the water vapor and transport of generated hydrogen.

13. The pressurized hydrogen generator of claim 12 and further comprising a pressure release valve coupled to the air gaps and operable to maintain hydrogen pressure in the container at or below a predetermined pressure.

14. The pressurized hydrogen generator of claim 9 and further comprising perforated metal supports coupled to the membranes and positioned to support the membranes, confine the hollow cylinders of chemical hydride, and transfer heat generated during reaction of the chemical hydride with water vapor.

15. The pressurized hydrogen generator of claim 9 wherein the hollow cylinders of chemical hydride are formed a with grain size of from approximately 1 to 100 μm.

* * * * *